(12) United States Patent
Robb et al.

(10) Patent No.: US 7,306,040 B1
(45) Date of Patent: Dec. 11, 2007

(54) STIMULI-DEGRADABLE GELS

(75) Inventors: Ian D. Robb, Duncan, OK (US);
Rajesh K. Saini, Duncan, OK (US);
Diptabhas Sarkar, Houston, TX (US);
Bradley L. Todd, Duncan, OK (US);
James M. Griffin, Hessle (GB)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/446,286

(22) Filed: Jun. 2, 2006

(51) Int. Cl.
*E21B 43/25* (2006.01)

(52) U.S. Cl. .................................................. 166/300

(58) Field of Classification Search ............... None
See application file for complete search history.

(56) References Cited

U.S. PATENT DOCUMENTS

| | | | |
|---|---|---|---|
| 4,304,767 A | 12/1981 | Heller et al. .............. 424/78 |
| 5,124,421 A | 6/1992 | Ulbrich et al. ............ 526/212 |
| 5,191,015 A | 3/1993 | Sheppard et al. ......... 525/54.1 |
| 5,373,901 A | 12/1994 | Norman et al. ........... 166/300 |
| 6,444,316 B1 | 9/2002 | Reddy et al. .............. 428/407 |
| 6,488,091 B1 | 12/2002 | Weaver et al. ............. 166/300 |
| 6,527,051 B1 | 3/2003 | Reddy et al. .............. 166/300 |
| 6,554,071 B1 | 4/2003 | Reddy et al. .............. 166/293 |
| 6,822,000 B2 | 11/2004 | Ng et al. ................... 514/510 |
| 2003/0211158 A1 | 11/2003 | Frechet et al. ............ 424/486 |
| 2004/0096506 A1 | 5/2004 | Heller et al. .............. 424/486 |
| 2006/0046938 A1* | 3/2006 | Harris et al. .............. 507/219 |
| 2006/0169182 A1* | 8/2006 | Todd et al. ................ 106/802 |

OTHER PUBLICATIONS

J. Am. Chem. Soc. 2002, 124, p. 12399.
E. Themisou, et al., *Macromolecules 2004*, vol. 37, pp. 6734-6743.
Israelachvili, et al., *Theory of Self-Assembly of Hydrocarbon Amphiphiles into Micelles and Bilayers*, The Australian National University, Nov. 1975.

* cited by examiner

*Primary Examiner*—Jennifer H. Gay
*Assistant Examiner*—Kerry W. Leonard
(74) *Attorney, Agent, or Firm*—Robert A. Kent; Baker Botts (57) ABSTRACT

Some methods are provided that comprise: providing a treatment fluid comprising an aqueous fluid, and a stimuli-degradable gel formed by a reaction comprising a gelling agent, and a stimuli-degradable cross linking agent that includes at least one degradable group and two unsaturated terminal groups; placing the treatment fluid into a subterranean formation; and allowing the stimuli-degradable gel to degrade.

20 Claims, 5 Drawing Sheets

STIMULI-DEGRADABLE GELS

BACKGROUND OF THE INVENTION

The present invention relates to methods and compositions useful in subterranean applications, and, more specifically, to stimuli-degradable gels.

Viscosified treatment fluids that are used in subterranean operations generally are often aqueous-based fluids that comprise gelling agents. Viscosified treatment fluids are often referred to in the oilfield industry as "gels." The term "gel" as used herein refers to a semi-solid, jelly-like state assumed by some colloidal dispersions. The term "colloidal dispersion" as used herein refers to a system in which finely divided particles are dispersed within a continuous medium. The gelling agents used to form gels often comprise macromolecules such as biopolymers or synthetic polymers. Common gelling agents include, e.g., galactomannan gums, cellulosic polymers, and other polysaccharides. As used herein, the term "treatment fluid" refers to any fluid that may be used in a subterranean application in conjunction with a desired function and/or for a desired purpose. The term "treatment fluid" does not imply any particular action by the fluid or any component thereof.

Most viscosified treatment fluids include cross-linked gelling agents that are cross-linked through a cross linking reaction between gelling agent molecules and a suitable cross linking agent. These cross linking agents may comprise a metal, a metal complex, or a metalloid, collectively referred to herein as "metal(s)." Examples include compounds containing boron, aluminum, antimony, zirconium, magnesium, or titanium. Generally, the metal of a cross linking agent interacts with at least two gelling agent molecules to form a crosslink between them, thereby forming a cross-linked gelling agent. The term "cross-linked gelling agent" as used herein refers to a gelling agent that contains, on average, at least one crosslink per molecule. This may be indicated when G'>G" at certain frequencies. The elastic modulus (or G') of a gel is an accepted standard measure of a gel's elasticity.

Pills are often used in subterranean applications. The term "pill" as used herein refers to a relatively small volume of specially prepared fluid placed or circulated in the well bore. Fluid pills are commonly prepared for a variety of special functions, such as a sweep pill prepared at high viscosity to circulate around the well bore and pick up debris or well bore fill. In counteracting lost-circulation problems, a lost-circulation pill prepared with flaked or fibrous material is designed to plug the perforations or formation interval losing the fluid. A "fluid-loss control pill" is a gelled fluid that is designed or used to provide some degree of fluid-loss control. Through a combination of viscosity, solids bridging, and cake buildup on the porous rock, these pills oftentimes are thought to seal off portions of the formation from fluid loss. They may also generally enhance filter-cake buildup on the face of the formation to inhibit fluid flow into the formation from the well bore. Pills often may involve a relatively small quantity (less than 200 bbl) of a special blend of a drilling fluid to accomplish a specific task that a regular drilling fluid cannot perform. Examples include high-viscosity pills to help lift cuttings out of a vertical well bore; freshwater pills to dissolve encroaching salt formations; pipe-freeing pills to destroy filter cake and relieve differential sticking forces; and lost circulation material pills to plug a thief zone.

Typically, pills comprise an aqueous base fluid and a high concentration of a gelling agent polymer, and, sometimes, bridging particles, like graded sand, potassium salts, or sized calcium carbonate particles. An example of a commonly used pill contains high concentrations (100 to 150 lbs/1000 gal) of a modified hydroxyethylcellulose ("HEC"). Some other gelling agent polymers that have been used include guar, guar derivatives, carboxymethylhydroxyethylcellulose ("CMHEC"), and even starch.

As an alternative to linear polymeric gels for pills, cross-linked gels often are used. Cross linking the gelling agent polymer is thought to create a gel structure that is better able to support solids and possibly, e.g., provide fluid-loss control. Further, cross-linked pills are thought to invade the formation face to a lesser extent to be desirably effective. To crosslink these gelling agents, a suitable cross linking agent that comprises polyvalent metal ions is often used. Complexes of aluminum, titanium, boron, and zirconium are common examples.

A disadvantage associated with conventional cross-linked gelling agents is that the resultant gel residue is often difficult to remove from the subterranean formation once the treatment has been completed. For example, in fracturing treatments, the cross-linked gels used are thought to be difficult to completely clean up with conventional breakers, such as oxidizers or enzymes. Similarly, the gel residue can be difficult and time-consuming to remove from the subterranean formation. The gel residue, at some point in the completion operation, usually should be removed to restore the formation's permeability, preferably to at least its original level. If the formation permeability is not restored to its original level, production levels can be significantly reduced. This gel residue often requires long cleanup periods. Moreover, an effective cleanup usually requires fluid circulation to provide high driving force, which is thought to allow diffusion to take place to help dissolve the concentrated buildup of the gel residue. Such fluid circulation, however, may not be feasible. Additionally, in lower temperature wells (i.e., those below about 80° F.), it is often difficult to find an internal breaker for the viscosified treatment fluids that will break the gel residue effectively. The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Another conventional method of cleaning up gel residue is to add a spot of a strong acid (e.g., 10% to 15% hydrochloric acid) with coiled tubing, which is expensive and can result in hazardous conditions.

New developments in cleaning and removing filter cakes left by fluid loss control additives and pills include materials that degrade under acidic conditions such as calcite. While such techniques can be effective, they require good contact between the acid generating compound and the acid soluble compound, which is not always easily achieved.

Another problem presented by today's cross-linked gelling agent systems with respect to cleanup is that the high temperature of the formations (e.g., bottom hole temperatures of about 200° F. or greater) often require cross linking agents that are more permanent, and thus harder to break. Examples include transition metal cross linking agents. These more permanent cross linking agents can make cleanup of the resulting gel residue more difficult.

SUMMARY OF THE INVENTION

The present invention relates to methods and compositions useful in subterranean applications, and more specifically, to stimuli-degradable.

In one embodiment, the present invention provides a method comprising: providing a treatment fluid comprising an aqueous base fluid, and a stimuli-degradable gel formed by a combination of a gelling agent, and a stimuli-degradable cross linking agent described by the following formula:

$$R^1\text{—[A]—[}R^3\text{]—[B]—}R^2$$

wherein $R^1$ and $R^2$ may be the same or different, and are selected from the group consisting of: substituted or unsubstituted ethylenically unsaturated groups, N-acryl, O-acryl, acrylol, vinyl, allyl, melamide, and derivatives or combinations thereof; A and B are optional bridging units; and $R^3$ is a degradable group or polymer; and placing the treatment fluid into a subterranean formation.

In one embodiment, the present invention provides a method comprising: providing a treatment fluid comprising an aqueous fluid, and a stimuli-degradable gel formed by a reaction comprising a gelling agent, and a stimuli-degradable cross linking agent that includes at least one degradable group and two unsaturated terminal groups; placing the treatment fluid into a subterranean formation; and allowing the stimuli-degradable gel to degrade.

In one embodiment, the present invention provides a method of providing fluid loss control in a subterranean application comprising the steps of: providing degradable crosslinked gelled particles that are formed by a reaction comprising a gelling agent, and a stimuli-degradable cross linking agent that includes at least one degradable group and two unsaturated terminal groups; introducing the degradable crosslinked gelled particles into a subterranean formation; and allowing the degradable crosslinked gelled particles to reduce the loss of fluid to a portion of the subterranean formation.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to methods and compositions useful in subterranean applications, and, more specifically, to stimuli-degradable gels.

The stimuli-degradable gels of the present invention can be used in any application in which it is desirable to have a stimuli-degradable gel. Suitable subterranean applications in which these stimuli-degradable gels can be used include pills (such as fluid loss control pills), fracturing fluids, temporary plugs (for example, in tubing), temporary sealing materials (e.g., in screens), drilling fluids, and drill-in fluids. They may be also used as fluid loss control agents when made in smaller forms.

In a subterranean application context, one of the desirable features of the stimuli-degradable gels of the present invention is that after a delay period, they degrade as a result of the degradation of their acid-degradable crosslinks, which allows the gel to break up into smaller components that should not negatively impact well productivity or the flow of fluids through the rock. In preferred embodiments, the smaller components should not impact well productivity to an appreciable extent. This time-triggered self-degradation may allow for the use of some equipment to be avoided (e.g., coiled tubing to acid spot for gel residue cleanup), thus reducing the overall cost of a well treatment.

Stimuli that may lead to the degradation of the gels of the present invention include any change in the condition or properties of the gel, such as a change in pH (e.g., caused by the buffering action of the rock or the decomposition of materials that release chemicals such as acids), or a change in the temperature of the fluid (e.g., caused by the contact of the fluid with the rock formation). In some respects, the stimuli can be considered a function of the rock formation; in a sense, at least in some circumstances, the rock formation can affect the degradation of the gel, thus, increasing the reliability of the application. The continuous rate of degradation of the stimuli-degradable gels may be affected by pH and temperature. For instance, their acid degradable crosslinks will degrade more rapidly as their environment becomes more acidic, being relatively stable at higher pHs (e.g., a pH of above about 10) but relatively unstable at lower pHs (e.g., a pH of less than about 9) at ambient temperatures. At higher temperatures, the crosslinks may degrade more quickly; at lower temperatures, less quickly. (Also, in some embodiments, at a pH of about 13 or greater with heat, the crosslinks may degrade at an appreciable level.) Thus, a pH change in the treatment fluid can trigger the degradable crosslinks in the stimuli-degradable gels to degrade. Once the degradable crosslinks degrade, the stimuli-degradable gel breaks up into smaller molecules that, in preferred embodiments, should be water soluble or, at least, water dispersible. In subterranean applications, these smaller molecules should not be in situ impediments to produced fluids. The terms "degrade" and "degradation" (and their derivatives) as used herein refer to the continuous loss of gel properties, characterized by a decrease in the elastic modulus (G') of the gelled system.

To form the stimuli-degradable gels of the present invention, degradable cross linking agents may be used to crosslink gelling agents that are formed from reactions comprising "ethylenically unsaturated monomers" that include substituted or unsubstituted ethylenically unsaturated monomer groups, vinyl groups, allyl groups, acryl groups, melamide groups, and acryloyl groups, and mixtures thereof. In certain embodiments, suitable gelling agents that may be used in conjunction with the stimuli-degradable cross linking agents of the present invention are made from reactions comprising ethylenically unsaturated monomers of the general formula $CH_2=CXY$, wherein X and Y may be hydrogen, alkyls, aryls, alkoxy, carboxylic acids, amides, acetamides, esters, ethers, and the like. Suitable examples include, but are not limited to, ethylene, propylene, butene-1, vinyl cyclohexane, styrene, vinyl toluene, ionizable monomers (such as 1-N,N-diethylaminoethylmethacrylate), diallyldimethylammonium chloride, 2-acrylamido-2-methyl propane sulfonate, and acrylic acid, and mixtures or derivatives thereof; allylic monomers (such as di-allyl phthalate, di-allyl maleate, allyl diglycol carbonate, and the like); vinyl formate, vinyl acetate, vinyl propionate, vinyl butyrate, crotonic acid, itaconic acid, vinyl fluoride, vinyl chloride, vinylidine fluoride, tetrafluoroethylene, acrylamide and its derivatives, methacrylamide, methacrylonitrile, acrolein, methyl vinyl ether, ethyl vinyl ether, vinyl ketone, ethyl vinyl ketone, allyl acetate, allyl propionate, and diethyl maleate; and diene monomers (such as butadiene, isoprene, and chloroprene, etc.); and mixtures or derivatives thereof. The term "group" as used herein refers to a combination of bonded atoms.

The cross linking reactions can be through a copolymerization reaction. The stimuli-degradable gels should be suitable for use at temperatures that they will encounter during subterranean operations. One of ordinary skill in the art, with the benefit of this disclosure, should be able to determine the appropriate degradable cross linking agent to use to form the stimuli-degradable gel based on, among other things, bottom hole temperatures that may be encountered. For instance, under moderately acidic conditions (pH of about 3), the stability of amides, ketals, and orthoesters is thought to decrease, in the order of amides>ketals>orthoesters.

The polymerization of the monomers can be done by any known methods such as free radical polymerization, cationic polymerization, anionic polymerization, condensation polymerization, coordination catalyst polymerization, and hydrogen transfer polymerization. The polymerization can be done in any manner, e.g., solution polymerization, precipitation polymerization, suspension polymerization, emulsion polymerization, and bulk polymerization; these are known methods described in the literature. Which particular method to use may depend on, inter alia, the gelling agent monomer and the cross linking agent used, and also the application for the resultant gel. In preferred embodiments, the stimuli-degradable cross linking agent is added to the gelling agent at the time of polymerization of the gelling agent monomers. This polymerization can be conducted in any manner suitable. Suitable temperatures and other conditions are well known.

Gelling agent monomers may be present in an amount of from about 1% to about 50% of the solution, and the cross linking agent may be present in an amount of from about 0.1% to about 15% of the monomer concentration. A preferred amount of the cross linking agent may be from about 0.5% to about 10% of the monomer concentration. In other embodiments, a stimuli-degradable cross linking agent may be added to the gelling agent after polymerization.

The stimuli-degradable cross linking agents include at least one degradable group, and two unsaturated terminal groups. In some embodiments, the cross linking agents of the present invention can be described by the following general formula:

$R^1-[A]-[R^3]-[B]-R^2$ wherein $R^1$ and $R^2$ represent two groups which may be the same or different, and are selected from substituted or unsubstituted ethylenically unsaturated groups, N-acryl, O-acryl, acryloyl, vinyl, allyl, and maleimide, and derivatives or combinations thereof, that are capable of polymerizing with the monomers of the gelling agents. A and B optionally are extra groups to aid compatibility of the cross linking groups with the reaction solvent. A and B are bridging units that are relatively unreactive with the other molecules to be cross-linked, and have functionalities that are compatible with the terminal groups. A and B may include peptide chains, aromatic substituents, alkyl chains, or polar groups to make the cross linking agent compatible with the reaction solvent and monomers forming the gelling agent. A and B may be tailored to change the properties of a particular embodiment of the cross linking agents of the present invention, e.g., to make it soluble in water or organic solvents, which may be important depending on the polymerization medium. $R^3$ can be a degradable group or a polymer.

In other embodiments, the degradable group may include any degradable group or plurality of groups including, but not limited to, esters, phosphate esters, amides, acetals, ketals, orthoesters, carbonates, anhydrides, silyl ethers, alkene oxides, ethers, imines, ether esters, ester amides, ester urethanes, carbonate urethanes, and amino acids, and derivatives or combinations thereof. The choice of the degradable group may be determined by pHs and temperatures, the details of which are available in known literature sources. The unsaturated terminal group may include substituted or unsubstituted ethylenically unsaturated groups, vinyl groups, allyl groups, acryl groups, or acryloyl groups, which are capable of undergoing polymerization with the above-mentioned gelling agents to form cross-linked stimuli-degradable gels. Examples include, but are not limited to, unsaturated esters such as acrylates, methacrylates, and butyl acrylates; amides such as acrylamide; and ethers such as vinyl ether; and combinations thereof. In one embodiment, a stimuli-degradable cross linking agent comprises a degradable crosslink and two vinyl groups. Some embodiments of these cross linking agents of the present invention are sensitive to changes in pH, such as ortho ester-based embodiments, acetal-based embodiments, ketal-based embodiments, and silicon-based embodiments. Generally speaking, at room temperature, the ortho ester-based embodiments should be stable at pHs of above 10, and should degrade at a pH below about 9; the acetal-based embodiments should be stable at pHs above about 8 and should degrade at pH below about 6; the ketal-based embodiments should be stable at pHs of about 7 and should degrade at a pH below 7; and the silicon-based embodiments should be stable at pHs above about 7 and should degrade faster in acidic media. Thus, under moderately acidic conditions (pH of around 3), the relative stability of these groups should decrease in the following order: amides>ketals>orthoester. At higher well bore temperatures, the more stable cross linking groups contain amides or ethers and would be preferred over other choices including esters, acetals, and ketals.

Also, some embodiments of the cross linking agents are sensitive to changes in temperature. Thus, where $R^3$ (in the formula above) is an ester group, the cross-linking agent may degrade at 170° F. in about 10 hours at pH 10.8, whereas when $R^3$ is an amide, the cross-linking agent may be stable for several days at pH 10.8 and 185° F.

The ester embodiments of the cross linking agents can be described as formed when any di, tri, or more functional alcohols react with unsaturated acids or acid chlorides. Examples include: poly(ethylene glycol) diacrylate, poly(ethylene glycol) dimethacrylate, poly(propylene glycol) diacrylate, and hexanediol acrylate. Some ether embodiments include: poly(ethylene glycol) divinyl ether, and 1,4-cyclohexane dimethanol divinyl ether; some amide embodiments include poly(ethylene glycol) bisacrylamide, and N,N'-(1,2 dihydroxyethylene) bisacrylamide. N,O-dimethacryloylhydroxylamine is a relatively acid stable cross-linking agent that should decompose more rapidly above pH 6.5, when formed as described U.S. Pat. No. 5,124,421.

An example of a cross linking agent suitable for use in the present invention is a short chain poly(lactic acid) substituted with an acrylate group on the two ends of the chain.

In certain embodiments, suitable orthoester cross linking agents may be synthesized from diketene acetals or multiketene acetals by the addition of two (in the case of a diketene acetal) or more mole equivalents (in the case of a multiketene acetal) of a monohydric alcohol containing ethylenically unsaturated monomers, acrylic groups, vinylic groups, or allylic groups that are suitable for polymerization with the monomers already described.

Examples of suitable diketene, or multiketene, acetals may be synthesized as described in U.S. Pat. No. 4,304,767, U.S. Pat. No. 6,822,000, and United States Patent Application Publication No. 2004/0096506, the relevant disclosures of which are incorporated herein by reference. In one embodiment, as illustrated below in Reaction Scheme 1, a diketene acetal may be synthesized by reacting pentaerythritol and chloroacetaldehyde dimethyl acetal in the presence of p-toluenesulfonic acid or methanesulfonic acid to afford 2, which on dehydrohalogenation in presence of t-butoxide in t-butanol afford diketene acetal 3, and a suitable orthoester cross linking agent 4 may be synthesized by reacting the resultant diketene acetal with two mole equivalent of the N-methylolacrylamide in the presence of a small amount of iodine dissolved in pyridine. In some embodiments, the orthoester cross linking agent may be synthesized by mixing the monohydric alcohol containing ethylenically unsaturated groups with the diketene acetal, without the aid of an iodine/pyridine catalyst, provided the alcohols and diketene acetals are extremely pure.

Reaction Scheme 1

Suitable degradable cross linking agents may be made to have a balance between hydrophobic or hydrophilic characteristics by using various kinds of mono alcohols. A water soluble degradable cross linking agent may be desirable, for instance, in a reaction of a gelling agent polymer in an aqueous medium and an organic solvent soluble cross linking agent for the polymerization reaction in a nonaqueous medium. In the design of the bisacrylamide orthoester cross linking agent, for example the acrylol alcohol, can be chosen based on certain factors, such as ease of synthesis, solubility, and the type of hydrogel or microparticle desired. The addition of N-methyloacrylamide to diketene acetal 3 should produce a water soluble cross linking agent, which may be more useful in an aqueous polymerization reaction. The cross linking agent can also be made to be soluble in organic solvents by incorporation of additional alkyl or methylene groups in the chain of the molecule. An orthoester cross linking agent prepared by the addition of 2-hydroxyethyl methacrylate to diketene acetal 3 resulted in the formation of a water insoluble cross linking agent 5 (Scheme 2). The cross linking agent 5 contains an ester group which should undergo hydrolysis at higher pH, and may be more suitable for lower temperature applications.

Reaction Scheme 2

5

Monohydric alcohols that contain ethylenically unsaturated groups can be any alcohol capable of reacting with the diketene acetal or multiketene acetal to form an orthoester cross linking agent. Exemplary alcohols suitable as reactants include hydroxyethylacrylate; hydroxypropyl methacrylamide; hydroxybutyl methacrylate; and glycerol monomethacrylate.

An example of a bisacrylamide orthoester cross linking agent is shown in Reaction Scheme 3 which may be used to form (e.g., by free radical polymerization reaction) an acrylamide cross-linked polymer, which may then degrade according to the reaction sequence shown in Reaction Scheme 3, (however, one should note that at higher pHs (e.g., about 13) the bisacrylamide orthoester cross linking agent may degrade by another mechanism, e.g., through amide bond cleavage):

Reaction Scheme 3

In certain embodiments, suitable orthoester cross linking agents may be synthesized by reacting, in one or more steps, a low molecular weight orthoester of Formula I, with a monohydric alcohol that contains ethylenically unsaturated groups in accordance with the scheme illustrated in Scheme 4.

Formula I wherein R is H, CH$_3$, or C$_2$H$_5$, and R$_4$ is an alkyl group having from about 1 to about 6 carbon atoms. Examples of suitable low molecular weight orthoesters of Formula I include, but may not be limited to, trimethyl orthoformate, trimethyl orthoacetate, triethyl orthoformate, triethyl orthoacetate, tripropyl orthoformate, and tripropyl orthoacetate. Low molecular weight orthoesters may be used due to the ease of transesterification undergone by these molecules with high molecular weight alcohols. Because the trimethyl orthoformate molecule has three positions that may be substituted by the reactants, the product of the reaction depicted in Reaction Scheme 4 can be made by either attaching two groups or three groups.

Reaction Scheme 4

Suitable cross linking agents also may be silicon-based. An example is an acid labile dimethacrylate cross linking agent shown in Reaction Scheme 5. Dimethyldi(methacryloyloxy-1-ethoxy)silane may be synthesized by reaction of 2-hydroxyethyl methacrylate (HEMA) and dichlorodiethyl silane in the presence of triethylamine, which can be copolymerized with the gelling agents of the present invention to form cross-linked stimuli-degradable gels. These cross-linked gels can be easily broken in acidic media.

Reaction Scheme 5

While the stimuli-degradable gels of the present invention included in the treatment fluids of the present invention are generally degradable, it may be desired, in some embodiments, for a faster degradation. Therefore, in some embodiments, to facilitate the degradation of the cross-linked polymer, and thus degrade the gel or gel particles, the pH of the treatment fluid may be decreased at a desired time. For example, in an orthoester cross-linked embodiment at a pH of about 8 or less, the orthoester crosslinks should degrade at reasonable rates. In subterranean applications, the buffering action of the formation together with temperature may, in some embodiments, provide the desired degradation.

Acetal cross linking agents can be made in many ways suitable for cross linking with the gelling agents that can be hydrolyzed in mild acidic conditions. Suitable cross linking agents based on bisacryloyl acetal moiety are described in United States Patent Application Publication No. 2003/0211158, the disclosure of which is herein incorporated by reference. These cross linking agents can be tuned to be water-soluble or -insoluble, depending on bridging substituents and attached groups in the molecule. A general procedure to synthesize an acetal is to react an aldehyde with alcohol. For synthesizing an embodiment of an acetal cross linking agent of the present invention, we can react an aromatic aldehyde with a monohydric alcohol containing ethylenically unsaturated groups in the presence of an acid catalyst. In some cases the ethylenically unsaturated groups can be added after the reaction of the alcohol with the aldehyde, as shown in United States Patent Application Publication No. 2003/0211158. In addition to the acetals already described above as being suitable, bisacrylamide acetals, others are also suitable, including diketene acetals that have a functionality of two or more (i.e., two or more unsaturated groups), as described in U.S. Pat. No. 4,304,767 and United States Patent Application Publication No. 2003/0211158 A1, the disclosures of which are incorporated herein by reference.

Suitable ketal cross linking agents are described in U.S. Pat. No. 5,191,015, and are described in Reaction Scheme 6.

Reaction Scheme 6

-continued

Because the degradable cross linking agents have a degradable group, degradation of this bond in the stimuli-degradable gel once formed should at least partially result in a degradation of the gel. The degradable group is capable of undergoing an irreversible degradation. The term "irreversible," as used herein, means that a degradable cross linking agent or a stimuli-degradable gel of the present invention should degrade in situ (e.g., within a well bore) but should not reform in situ after degradation. The terms "degradation" and/or "degradable," as used herein, refer to the conversion of materials into smaller components, intermediates, or end products by chemical processes such as hydrolytic degradation or by the action of biological entities, such as bacteria or enzymes. It refers to both heterogeneous (or bulk erosion) and homogenous (or surface erosion), and any stage of degradation between these two by action of water on the degradable group. This degradation may be the result of, inter alia, a chemical reaction, a thermal reaction, an enzymatic reaction, or a reaction induced by radiation. The degradability of the stimuli-degradable gel used in the methods of the present invention depends, at least in part, on the backbone structure of the cross linking agent. For instance, the presence of hydrolysable and/or oxidizable linkages in the backbone often yields a degradable cross linking agent that will degrade as described herein. The rates at which such cross linking agents degrade are dependent on the environment to which the degradable cross linking agent and/or stimuli-degradable gel is subjected, e.g., temperature, the presence of moisture, oxygen, microorganisms, enzymes, pH, and the like may affect the rate of degradation.

Among other things, as stated above, degradation of the cross linking agent may be sensitive to pH and temperature. Generally speaking, with an increase in temperature, the hydrolysis of the degradable group should be faster. To reduce the pH of the treatment fluid at a desired time, a number of methods may be employed. In some embodiments, the treatment fluid may be contacted by an acid after introduction of the treatment fluid into the subterranean formation. Examples of suitable acids include, but are not limited to, hydrochloric acid, hydrofluoric acid, formic acid, phosphoric acid, sulfamic acid, and acetic acid, and derivatives thereof, and mixtures thereof. In other embodiments, a delayed-release acid, such as an acid-releasing degradable material or an encapsulated acid, may be included in the treatment fluid so as to reduce the pH of the treatment fluid at a desired time, for example, after introduction of the treatment fluid into the subterranean formation. Suitable encapsulated acids that may be included in the treatment fluids of the present invention include, but are not limited to, fumaric acid, formic acid, acetic acid, acetic anhydride, anhydrides, hydrochloric acid, and hydrofluoric acid, and combinations thereof, and the like. Exemplary encapsulation methodology is described in U.S. Pat. Nos. 5,373,901; 6,444,316; 6,527,051; and 6,554,071, the relevant disclosures of which are incorporated herein by reference. Acid-releasing degradable materials also may be included in the treatment fluids of the present invention to decrease the pH of the fluid. Suitable acid-releasing degradable materials that may be used in conjunction with the present invention are those materials that are substantially water-insoluble such that they degrade over time, rather than instantaneously, to produce an acid. Examples of suitable acid-releasing degradable materials include esters, polyesters, orthoesters, polyorthoesters, lactides, polylactides, glycolides, polyglycolides, substituted lactides wherein the substituted group comprises hydrogen, alkyl, aryl, alkylaryl, and acetyl, and mixtures thereof, substantially water-insoluble anhydrides, and poly(anhydrides), and mixtures and copolymers thereof. Materials suitable for use as an acid-releasing degradable material of the present invention may be considered degradable if the degradation is due, inter alia, to chemical processes, such as hydrolysis, oxidation, or enzymatic decomposition. The appropriate pH-adjusting agent or acid-releasing material and amount thereof may depend upon the formation characteristics and conditions, the particular orthoester-based surfactant chosen, and other factors known to individuals skilled in the art, with the benefit of this disclosure.

In most embodiments, the stimuli-degradable cross linking agents suitable for use in the present invention should be relatively easy to synthesize in large amounts, and should have good stability for long-term storage, especially in anhydrous conditions.

In one embodiment, a cross-linked gelling agent that has been cross-linked with a cross linking reaction comprising a stimuli-degradable cross linking agent may be added to an aqueous treatment fluid (e.g., a pill, a fracturing fluid, or a gravel pack fluid), and then introduced into a subterranean formation. Suitable aqueous treatment fluids include freshwater, salt water, brine, seawater, or any other aqueous liquid that does not adversely react with the other components used in accordance with this invention or with the subterranean formation.

In some embodiments, the treatment fluid may be foamed. One advantage of using a foamed treatment fluid over a non-foamed version is that less of the aqueous fluid is used, relatively speaking. This may be important in subterranean formations that are water-sensitive or under pressure. In some embodiments, the foamed treatment fluids have a foam quality of about 30% or above. These may include commingled fluids. A preferred foam quality level is about 50% or above.

In some embodiments wherein the treatment fluid is foamed, the treatment fluid may comprise a surfactant. The choice of whether to use a surfactant will be governed at least in part by the mineralogy of the formation. As will be understood by those skilled in the art, anionic, cationic, nonionic, or amphoteric surfactants also may be used so long as the conditions they are exposed to during use are such that they display the desired foaming properties. For example, in particular embodiments, mixtures of cationic and amphoteric surfactants may be used. When used in treatment fluid embodiments, the surfactant is present in an amount of from about 0.01% to about 5% by volume. When foamed, the base fluid may comprise a gas. While various gases can be utilized for foaming the treatment fluids of this invention, nitrogen, carbon dioxide, and mixtures thereof are preferred. In examples of such embodiments, the gas may be present in a base fluid and/or a delayed tackifying composition in an amount in the range of from about 5% to about 95% by volume, and more preferably in the range of from about 20% to about 80%. The amount of gas to incorporate into the fluid may be affected by factors including the viscosity of the fluid and bottomhole pressures involved in a particular application. Examples of preferred foaming agents that can be utilized to foam the base fluid and/or the delayed tackifying composition of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Cocoamidopropyl betaine is especially preferred. Other suitable surfactants available from Halliburton Energy Services include: "19N™," "G-Sperse™dispersant," "Morflo III®" surfactant, "Hyflo® IV M" surfactant, "Pen-88M™" surfactant, "HC-2™ Agent," "Pen-88 HT™" surfactant, "SEM-7™" emulsifier, "Howco-Suds™", foaming agent, "Howco Sticks™" surfactant, "A-Sperse™" dispersing aid for acid additives, "SSO-21E™" surfactant, and "SSO-21MW™" surfactant. Other suitable foaming agents and foam-stabilizing agents may be included as well, which will be known to those skilled in the art with the benefit of this disclosure. The foaming agent is generally present in a treatment fluid of the present invention in an amount in the range of from about 0.01% to about 5%, by volume, more preferably in the amount of from about 0.2% to about 1%, and most preferably about 0.6% by volume.

Optionally, the treatment fluid may comprise a second gelling agent. Any gelling agent suitable for use in subterranean applications may be used in these treatment fluids, including, but not limited to, natural biopolymers, synthetic polymers, cross-linked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, or synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, karaya, diutan, scleroglucan, wellan, gellan, xanthan, tragacanth, and carrageenan, and derivatives of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, issued Dec. 3, 2002 to Weaver, et al., the relevant disclosure of which is incorporated herein by reference. Suitable gelling agents generally may be present in the compositions of the present invention in an amount in the range of from about 0.1% to about 5% by weight of the water therein.

Combinations of surfactants may be used in the present invention so that they form elongated or rod-like micelles or structures that can control the viscosity of a well bore treatment fluid. While these systems may lead to good filter cake cleanup, their fluid loss control power may be considered poor. However, addition of stimuli-degradable gel particles to viscoelastic surfactants gives much improved fluid loss control while maintaining good filter cake removal. Combinations of surfactants that have an average packing factor of between about ⅓ to ½ are thought to give good viscosity control. Examples include combinations of betaines and fatty acids.

If a second gelling agent is used, a suitable breaker may be necessary to ultimately reduce the viscosity of the fluid to a desirable extent or any undesirable resulting gel residue. Any breaker suitable for use in the subterranean formation and with the gelling agent may be used. The amount of a breaker to include will depend, inter alia, on the amount of gelling agent present in the treatment fluid or the amount of gel residue present in the formation. Other considerations regarding the breaker are known to one skilled in the art with the benefit of this disclosure.

A treatment fluid may comprise proppant or gravel particulates, as needed. Any proppant or gravel particulates that are suitable for use in subterranean applications may be used in the treatment fluids of the present invention.

To delay the degradation of a degradable crosslink or a stimuli-degradable gel, an inhibitor may be included in the gel. Suitable inhibitors include bases. Examples of some preferred inhibitors may include metal hydroxides, potassium hydroxide, amines such as hexamethylenetetramine, and sodium carbonate, and combinations thereof. In certain embodiments, a small amount of a strong base as opposed to a large amount of a relatively weak base is preferred to achieve the delayed degradation.

In some embodiments, the stimuli-degradable gels of the present invention may be used as or in conjunction with fluid loss control pills. A "fluid-loss control pill" is a gelled fluid that is designed or used to provide some degree of fluid-loss control. Through a combination of viscosity, solids bridging, and cake buildup on the porous rock, these pills oftentimes are able to reduce fluid loss from portions of a formation. They also generally enhance filter-cake buildup on the face of the formation to inhibit fluid flow into the formation from the well bore.

In some embodiments, stimuli-degradable cross-linking agents may be used to form degradable cross-linked fluid loss control agents that comprise stimuli-degradable gel particles. These fluid loss control agents can be added to any treatment fluid wherein it is desirable to control fluid loss.

Two methods of making stimuli-degradable gel particles include forming an emulsion, or forming a large gel and chopping up the cross-linked polymer. An embodiment of the emulsion method consists of forming a water-in-oil emulsion with appropriate surfactants, an appropriate initiator, a stimuli-degradable cross linking agent, and chosen monomers to form the gelling agent. This emulsion can be heated to initiate polymerization in the water phase. When polymer formation is complete, the gel particles can be recovered by inversion of the emulsion. Alternatively, a macroscopic gel can be formed by copolymerizing the cross linking agent with the gelling agent monomers in an appropriate solvent. The resultant gel can then be chopped up into smaller particles as desired using a high speed shearing device such as a Waring blender. A pourable dispersion of gel particles should result.

Although this invention has been described in terms of some specific uses of the stimuli-degradable cross linking agents and stimuli-degradable gels of the present invention, these may be used in other applications, as recognized by one of skill in the art with the benefit of this disclosure.

To facilitate a better understanding of the present invention, the following examples of certain aspects of some embodiments are given. In no way should the following examples be read to limit, or define, the scope of the invention.

EXAMPLES

Example 1

The fluid loss efficiency of the stimuli-degradable gel particles of the present invention was tested by comparing the fluid loss of mixtures of starch and xanthan, with and without the stimuli-degradable gel particles. The stimuli-degradable gel particles were made from polyacrylamide and a bisacrylamide stimuli-degradable cross linking agent. The particles were prepared by making a water-in-oil emulsion, i.e., dispersing an aqueous solution of acrylamide, the cross linking agent, and an initiator in an oil phase, followed by polymerization within the dispersed phase. The composition of the aqueous solution was as follows: water (200 g), sodium chloride (15 g), acrylamide (50 g), bisacrylamide cross linking agent (5 g), sodium carbonate (1 g), and potassium persulfate (1 g). The oil phase was made up of Norpar™12 oil (100 g) available from ExxonMobil at various locations, xylene (100 g), and Hypermer™ surfactant (B246SF) available from ICI Chemicals at various locations (2 g). A water-in-oil emulsion was formed by shearing the mixture in a Silverson emulsifier at 5000 rpm for 5 minutes. The ensuing water droplets were approximately 10 microns in diameter. The water-in-oil emulsion was then kept overnight at 60° C. to complete the polymerization process. Excess oil was removed by centrifugation.

A starch component was then prepared. This starch component was prepared by forming a dispersion of 100 g of WLC-4, which is a modified starch fluid loss control component available from Halliburton Energy Services, Duncan, Okla., in 500 g of water, and then boiling the dispersion for 2 minutes to gelatinize the starch. The thick solution was then freeze dried.

A xanthan component was then prepared. It was prepared by dissolving food grade xanthan (available from Kelco at various locations) in an aqueous solution at ambient temperature with vigorous stirring.

The filtration mixture was prepared by first dispersing 5 g of the stimuli-degradable gel particles in 500 g of water using the surfactant $NP(EO)_{10.5}$, followed by the addition of 30 g of potassium chloride, 5 g of pre-gelatinized WLC-4, and 2.5 g of food grade xanthan.

Aqueous dispersions, with and without the stimuli-degradable gel particles, were passed through discs of Berea sandstone (having a permeability of 30 to 50 mD) under an applied pressure of 500 psi and the rate of fluid loss measured. The resulting data is shown in FIG. 1.

Figure 1:
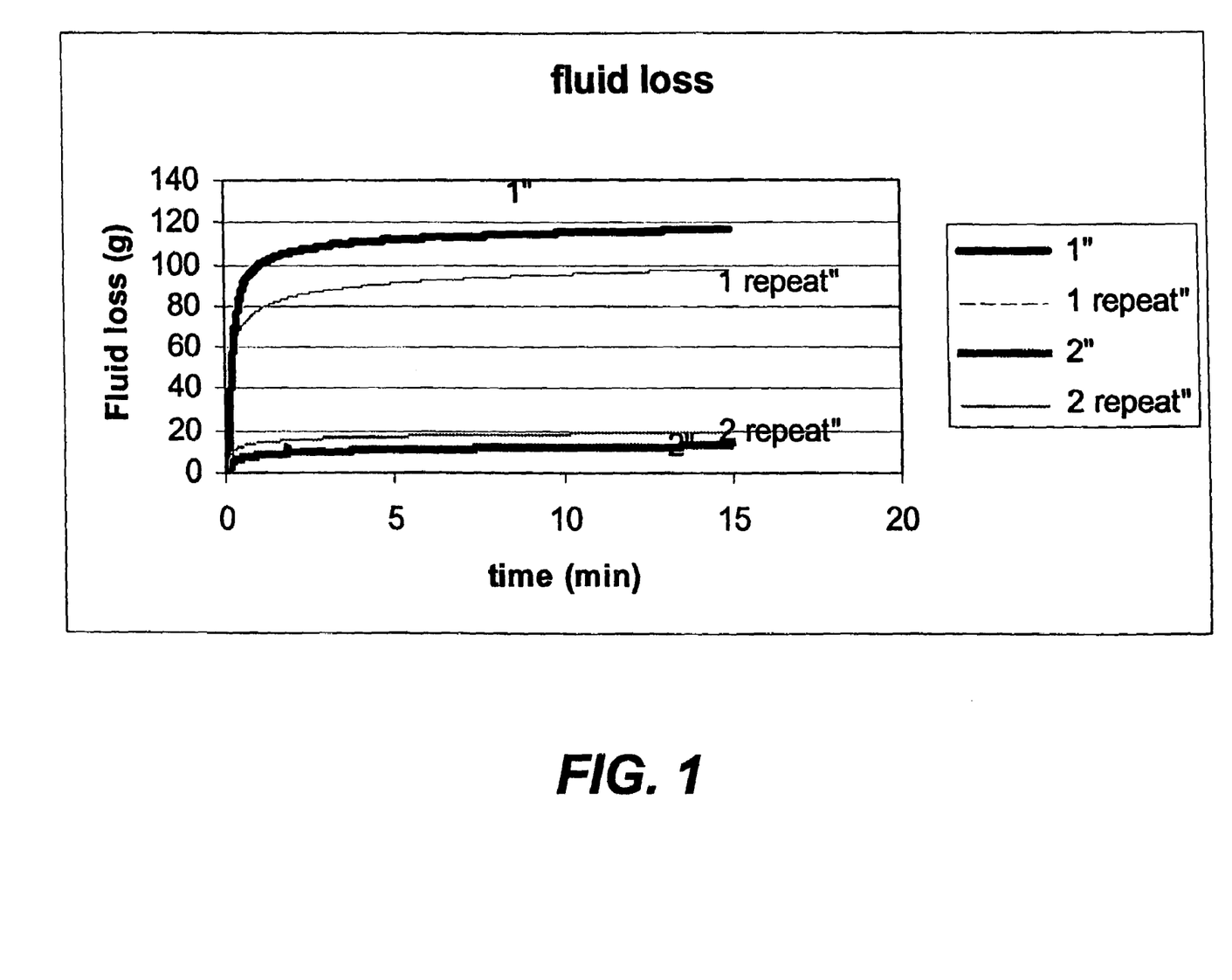
FIG. 1 illustrates a graph of data referenced in the Examples section, which shows fluid loss for a system of starch (1.0%) and xanthan (0.5%) with and without gel balls at 500 psi through rock of permeability of approximately 30 mD. Lines 1 and 1 repeat show data without gel balls. Lines 2 and 2 repeat: show data with gel balls.

As can be seen from FIG. 1, it appears, inter alia, that the addition of the stimuli-degradable gel particles reduces fluid loss of the aqueous dispersion.

Example 2

To demonstrate the degradation of the stimuli-degradable gel particles, samples of poly(acrylamide) [10% in water] cross-linked with a bisacrylamide orthoester (4) stimuli-degradable cross linking agent [10% w/w on the acrylamide monomer] were prepared using potassium persulfate as the initiator. Small samples of these gels were placed in 10 ml of buffer solutions having pH of 4, 7 and 10. These solutions were placed in a thermostat at 75° C. for 1 hour. The stimuli-degradable gel particles at pH 4 and 7 had degraded, whereas the one at pH 10 remained intact, as would be expected.

Example 3

Examples of application of stimuli-degradable gel particles of the present invention as fluid loss agents.

Gels were prepared by forming a homogeneous solution of the following: acrylamide monomer (M gm in 100 g water) with water (100 gm); ammonium persulfate (0.6 g); N,N,N'N' tetraethyl ethylene diamine (TEED) (0.4 ml) and bisacrylamide cross linking agent (X % of M). A known weight (V gm) of the cross-linked polyacrylamide (PAm) gel that was formed was then added to (100-V) gm of water and mechanically chopped, initially in a Waring blender at 2000 rpm for 1 min; then in a Silverson emulsifier at speeds varying from 4,000 to 10,000 rpm for 2 minutes. The resulting gel dispersion was then flowed through a filter cake of solid particles such as silica or calcite, prepared in the following way: calcite (10 g of 200 mesh) particles were dispersed in 150 ml of water in a Waring blender and then filtered at 30 psi pressure through a Whatman 42 filter paper held in a standard high pressure, high temperature fluid loss cell. About 5 mls of water were initially left covering the resulting calcite filter cake, and these were removed by a pipette to avoid cracking of the cake. From the flow rates of water through the calcite cake, the permeability was found to be 11 mD. Filter cakes prepared in this way are thought to resemble the formation of sandstone rocks, and have been found to be much more reproducible than natural or synthetic rocks.

Figure 2:
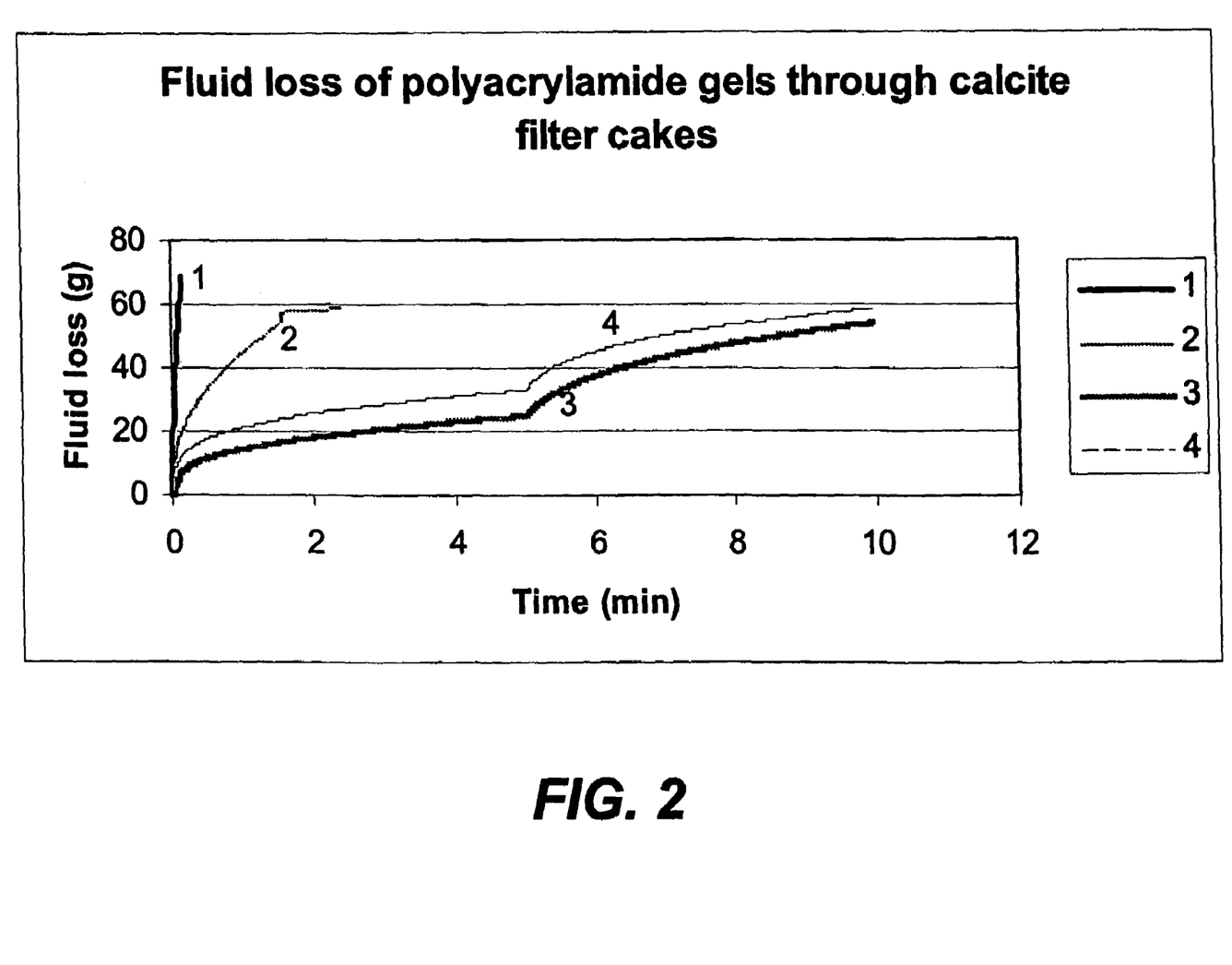
FIG. 2 illustrates a graph of data referenced in the Examples section, which shows fluid loss of polyacrylamide (PAm) gels of various gel strengths and compositions through calcite filter cake, measured at 500 psi for 5 minutes followed at 1000 psi for a further 5 minutes. Line 1 shows 30% acrylamide in gel with 5% cross linker on PAm and 5% volume fraction of gel in fluid, measured at 500 psi only. Line 2 shows 10% acrylamide in gel, 5% cross linker on PAm, and 5% volume fraction of gel in fluid at 500 psi only. Line 3 shows 3% acrylamide in gel, 5% cross linker on PAm, and 5% volume fraction of gel in fluid, measured at 500 and 1000 psi for 5 minutes each. Line 4 is a repeat of line 3.

The gel dispersion was then placed on a calcite cake and the fluid loss was measured at pressures of 500 or 1000 psi and ambient temperature. The results are shown in FIG. 2, which illustrates the fluid loss of polyacrylamide gels through 200 mesh calcite filter cakes at 500 and 1000 psi; 30M means that each gel particle, on average, comprised 30% polyacrylamide; 5× means that the cross linking agent was 5% by weight of the polymer in each gel particle; 5% V means that the gel dispersion was 5% by volume of the total dispersion. It is believed that for this particular system of polyacrylamide gel particles (having various monomer levels, 5% of the monomer as cross linking agent and 5% by volume gel particles in the fluid), that fluid loss was reduced as the monomer concentration in the gel was reduced.

Example 4

Figure 3:
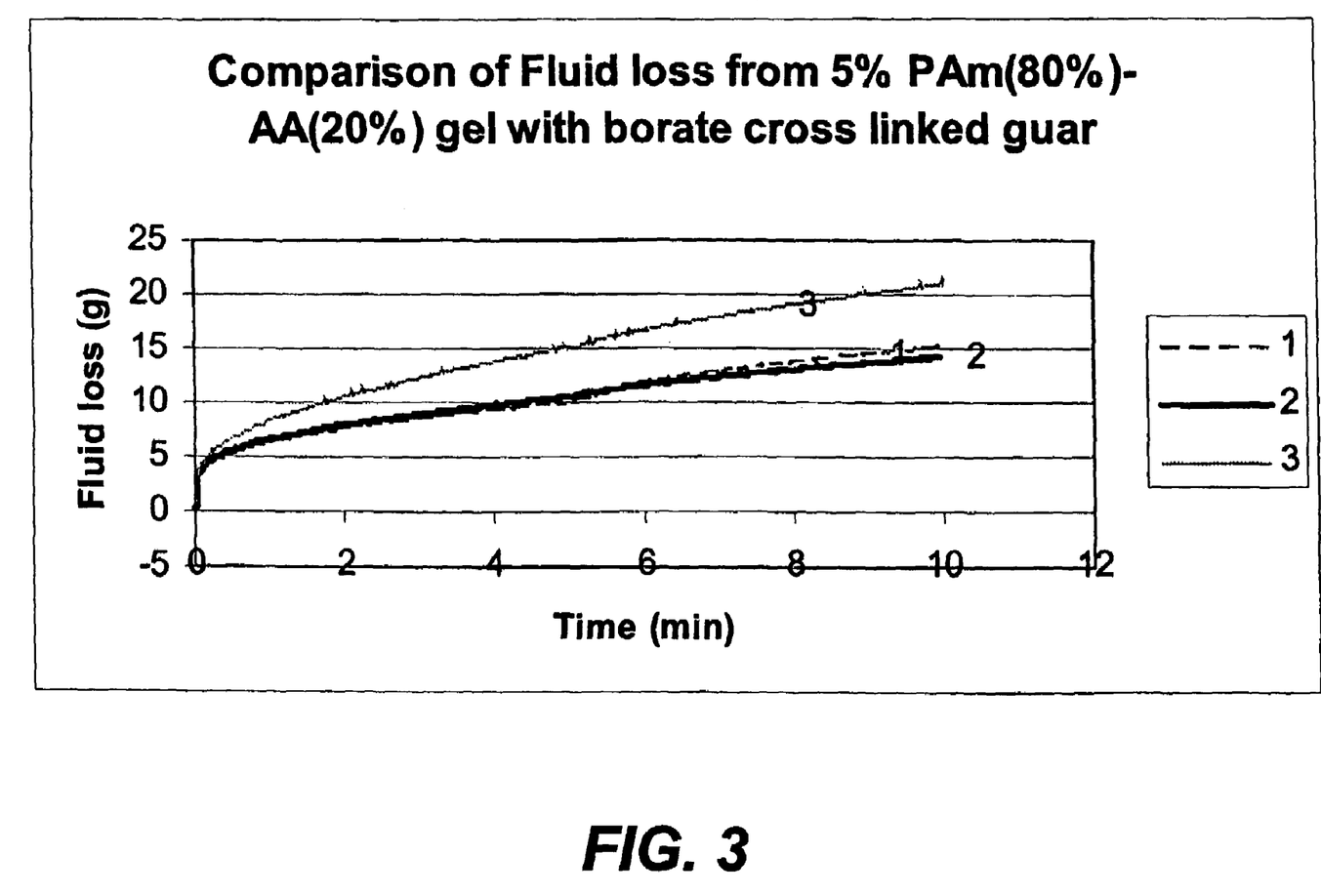
FIG. 3 illustrates a graph of data referenced in the Examples section, which shows a comparison of fluid loss from systems of gel particles (of 5% PAm-acrylic acid gel) at various volume fractions with a borate crosslinked guar system. These were measured at 500 psi for 5 minutes, followed by 1000 psi for a further 5 minutes. Line 1 shows 20% PAm-AA phase volume of gel particles. Line 2 shows a borate cross linked guar (0.5%) system. Line 3 shows 10% PAm-AA phase volume of gel particles.

The fluid loss of the polymer gels was compared with a standard borate cross-linked guar system, using 0.5% guar, a calcite filter cake as in Example 3, and gels prepared from mixtures of acrylamide ("AM") 80% by weight and acrylic acid ("AA") 20% by weight. The gels were prepared as in Example 3 and the fluid loss measured in an HPHT cell at 500 and 1000 psi. The cross-linked guar system was prepared by dissolving standard guar (0.5 g) (obtained from Rhodia) in water (100 g), and adding sodium borate as a cross linking agent at a pH of 10.5. The polymer gel was chopped as in Example 3, though the guar gel was used without chopping. The results are shown in FIG. 3, which illustrates a comparison of the fluid loss of polymer gel particles with cross-linked guar through calcite filter cakes at 500 and 1000 psi. Pressure was increased to 1000 psi after 5 min. The results in FIG. 3 (comparing 10% and 20% PAm-AA) show, as expected, that fluid loss is reduced by having more gel particles in the fluid and that 20% phase volume PAm-AA gave comparable fluid loss to a standard borate cross-linked guar.

Example 5

Figure 4:
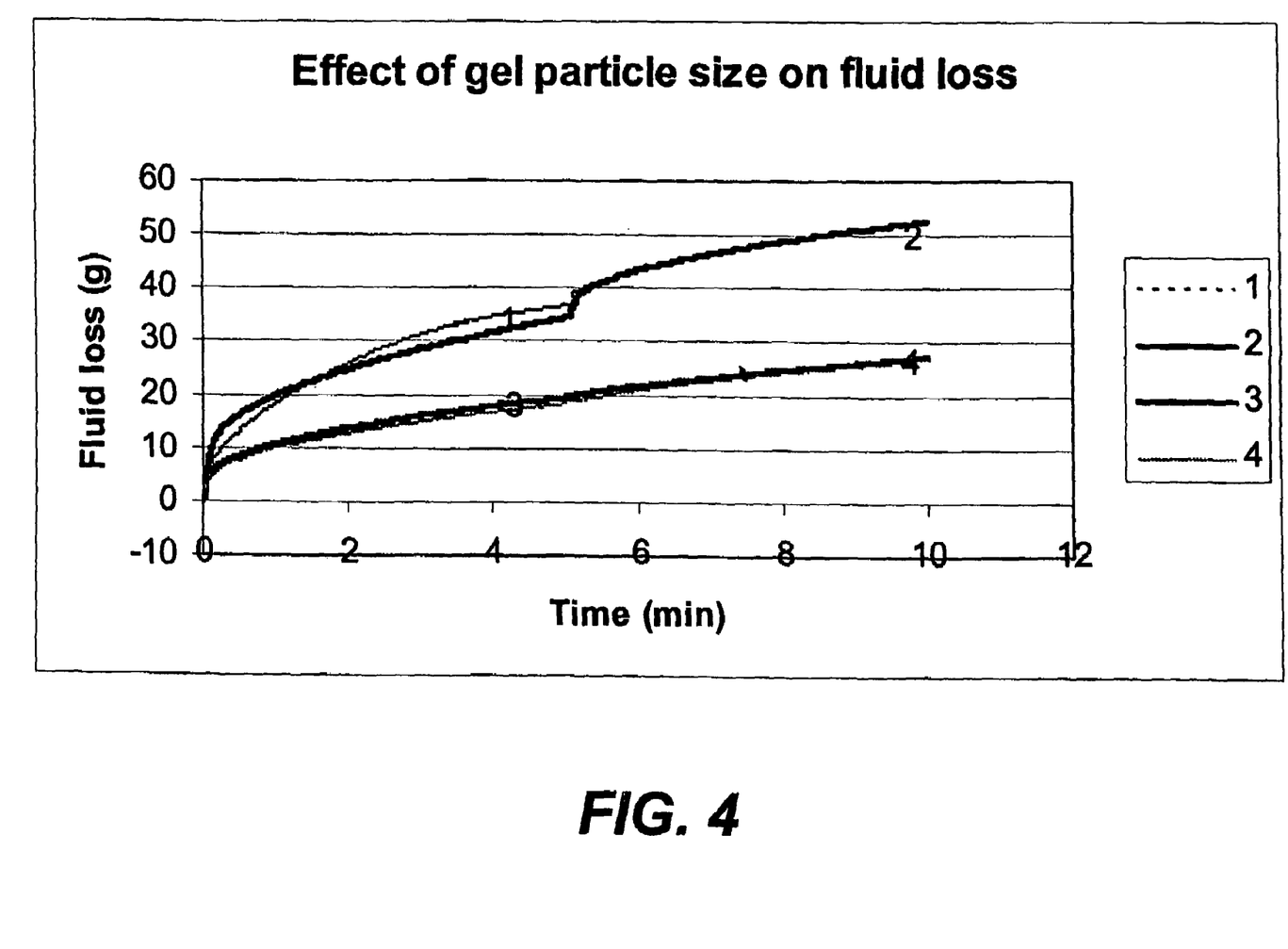
FIG. 4 illustrates a graph of data referenced in the Examples section, which illustrates an effect of size of poly(acrylamide-acrylic acid) gel particles on fluid loss through a calcite filter cake when measured at 500 psi for 5 minutes followed by 1000 psi for a further 5 minutes. Line 1 shows PAm-AA gel particles of 100-200 microns average size. Line 2 shows a repeat of Line 1. Line 3 shows PAm-AA gel particles of 50-100 microns average size. Line 4 shows a repeat of Line 3

To study the effect of particle size on fluid loss, a PAm (80%)-AA (20%) gel was made having 10% M; 2% X. A 5% dispersion of this gel in water was made and mechanically chopped in the Silverson stirrer at speeds of 6000 rpm and 10,000 rpm, producing particles in the range of 100-200μ and 50-100μ, respectively. The fluid loss of these gel dispersions were measured on the calcite filter cake as in Example 3 and the results are shown in FIG. 4, where the pressure was increased from 500 to 1000 psi after 5 minutes. The sizes of the gel particles were measured by microscopy, comparing the particles with a standard length on a graticule. As shown in FIG. 4, the chopped PAm-AA gel particles appeared to reduce fluid loss through the calcite filter cake (11 mD permeability) the fluid loss without the gel particles are about 200 mls after only 10 seconds at 500 psi. The results in FIG. 4 appear to indicate that the size of the gel particles may affect the amount of fluid loss, with the smaller (hence more numerous) particles appearing to give less fluid loss.

Example 6

Figure 5:
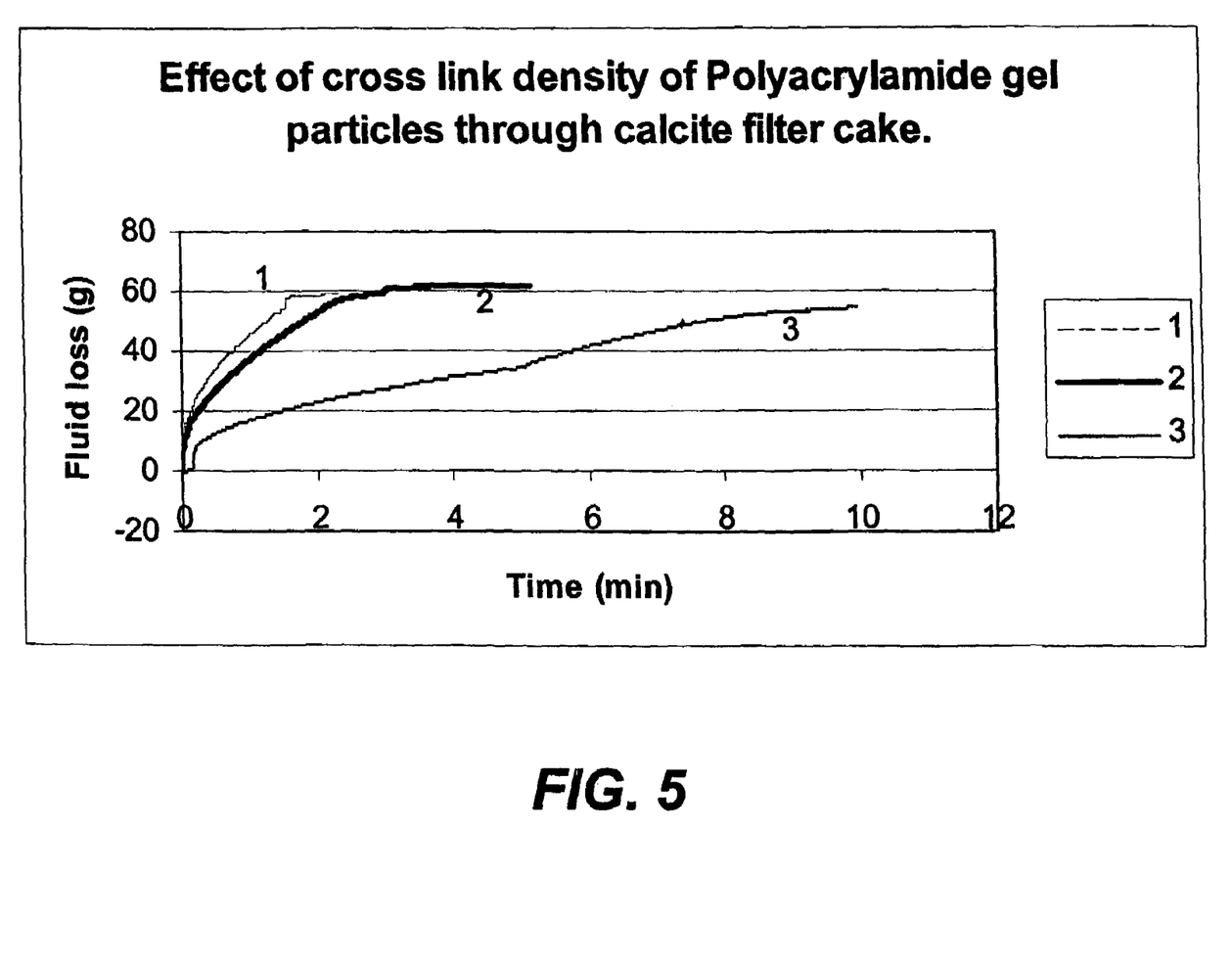
FIG. 5 illustrates a graph of data referenced in the Examples section, which illustrates an effect of cross link density of polyacrylamide gel particles on the fluid loss of these particles through calcite filter cakes measured at 500 psi for 5 minutes followed by 1000 psi for a further 5 minutes. Line 1 shows 10% acrylamide in the gel, 5% cross linker, and 5% phase volume of gel in fluid. Line 2 shows 10% acrylamide in gel, 3% cross linker, and 5% phase volume of gel in fluid. Line 3 shows 10% acrylamide in gel, 1% cross linker, and 5% phase volume of gel in fluid.

The effect of cross-linking density of the PAm gel on the fluid loss of a dispersion of it filtered through calcite filter cake at 500/1000 psi was measured. The gel was chopped in a Waring blender at 2000 rpm, and then through a Silverson at 6000 rpm for 2 min. The various cross linking densities are shown as values of X. The effect of cross-linking density on the fluid loss of a dispersion of PAm gel particles was measured when filtered through a calcite filter cake. The results in FIG. 5 appear to show that the cross-linking density has an effect on the fluid loss of a gel dispersion, with the least fluid loss occurring with lower levels of cross linking agent.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing a treatment fluid comprising an aqueous base fluid, and a stimuli-degradable gel formed by a combination of a gelling agent, and a stimuli-degradable cross linking agent described by the following formula:

$R^1$—[A]—[$R^3$]—[B]—$R^2$ wherein $R^1$ and $R^2$ may be the same or different, and comprise at least one group selected from the group consisting of: a substituted or unsubstituted ethylenically unsaturated group, N-acryl, O-acryl, acryloyl, vinyl, allyl, melamide, a derivative thereof, and a combination thereof; A and B comprise optional bridging units; and $R^3$ comprises a degradable group or polymer; and
   placing the treatment fluid into a subterranean formation.

2. The method of claim 1 wherein the gelling agent comprises at least one gelling agent selected from the group consisting of: an ethylenically unsaturated monomer of the general formula $CH_2$=CXY, wherein X and Y may be hydrogen, an alkoxy amide group, or an acetamide group; ethylene; propylene; butene-1; vinyl cyclohexane; vinyl cyclohexene; styrene; vinyl toluene; an ionizable monomer; 1-N,N-diethylaminoethylmethacrylate; diallyldimethylammonium chloride; 2-acrylamido-2-methyl propane sulfonate; acrylic acid; 2-acrylamido-2-methyl propane sulfonate; acrylic acid; an allylic monomer; di-allyl phthalate; di-allyl maleate; allyl diglycol carbonate; vinyl formate; vinyl acetate; vinyl propionate; vinyl butyrate; crotonic acid; itaconic acid; vinyl fluoride; vinyl chloride; vinylidine; fluoride; tetrafluoroethylene; acrylamide; methacrylamide; methacrylonitrile; acrolein; methyl vinyl ether; ethyl vinyl ether; vinyl ketone; ethyl vinyl ketone; allyl acetate; allyl propionate; diethyl maleate; a diene monomer; butadiene; isoprene; chloroprene; a derivative thereof; and a combination thereof.

3. The method of claim 1 wherein $R^3$ comprises at least one group selected from the group consisting of: an ester, a phosphate ester, an amide, an acetal, a ketal, an orthoester, a carbonate, an anhydride, a silyl ether, an alkene oxide, an ether, an imine, an ether ester, an ester amide, an ester urethane, a carbonate urethane, an amino acid, a derivative thereof, and a combination thereof.

4. The method of claim 1 wherein a G' of the treatment fluid at a first time is greater than the G' of the treatment fluid at a later second time because of the degradation of the stimuli-degradable gel.

5. The method of claim 1 wherein A or B comprises at least one group selected from the group consisting of: a peptide chain, an aromatic substituent, an alkyl group, an alkylene group, a polar group, and a derivative thereof.

6. The method of claim 1 wherein the cross linking agent is synthesized from diketene acetals or multiketene acetals by the addition of monohydric alcohol having acrylic, vinylic, or allylic groups.

7. The method of claim 6 wherein the monohydric alcohol comprises at least one monohydric alcohol selected from the group consisting of: hydroxyethylacrylate; hydroxypropyl methacrylamide; hydroxybutyl methacrylate; and glycerol monomethacrylate.

8. The method of claim 1 wherein the cross linking agent is formed by a reaction comprising a monohydric alcohol that contains a vinyl, allyl, or allylic group and a low molecular weight orthoester of Formula I:

wherein R is H, $CH_3$, or $C_2H_5$, and $R_4$ is an alkyl group having from about 1 to about 6 carbon atoms.

9. The method of claim 1 wherein the cross linking agent is water soluble.

10. The method of claim 1 wherein the treatment fluid is foamed and comprises a surfactant.

11. A method comprising:
   providing a treatment fluid comprising an aqueous fluid, and a stimuli-degradable gel formed by a reaction comprising a gelling agent, and a stimuli-degradable cross linking agent that includes at least one degradable group and two unsaturated terminal groups;
   placing the treatment fluid into a subterranean formation; and
   allowing the stimuli-degradable gel to degrade.

12. The method of claim 11 further comprising reducing the pH of the treatment fluid before allowing the stimuli-degradable gel to degrade.

13. The method of claim 11 further comprising subjecting the treatment fluid to a temperature change before allowing the stimuli-degradable gel to degrade.

14. The method of claim 11 wherein the degradable group comprises at least one degradable group selected from the group consisting of: an ester, a phosphate ester, an amide, an acetal, a ketal, an orthoester, a carbonate, an anhydride, a silyl ether, an alkene oxide, an ether, an imine, an ether ester, an ester amide, an ester urethane, a carbonate urethane, an amino acid, a derivative thereof, and a combination thereof.

15. The method of claim 11 wherein a G' of the treatment fluid is reduced upon degradation of the stimuli-degradable gel.

16. The method of claim 11 wherein at least one of the unsaturated terminal groups comprises at least one group selected from the group consisting of: a substituted or unsubstituted ethylenically unsaturated group, a vinyl group, an allyl group, an acryl group, an unsaturated ester, an acrylate, a methacrylate, a butyl acrylate, an amide, an acrylamide, an ether, a vinyl ether, a combination thereof, and a derivative thereof.

17. The method of claim 11 wherein the gelling agent comprises at least one gelling agent selected from the group consisting of: an ethylenically unsaturated monomer of the general formula $CH_2=CXY$, wherein X and Y may be hydrogen, an alkyl group, an aryl group, an alkoxy group, a carboxylic acid group an amide group, an alkoxy amide group, an acetamide group, an ester, or an ether; ethylene; propylene; butene-1; vinyl cyclohexane; styrene; vinyl toluene; an ionizable monomer; 1-N,N-diethylaminoethylmethacrylate; diallyldimethylammonium chloride; 2-acrylamido-2-methyl propane sulfonate; acrylic acid; 2-acrylamido-2-methyl propane sulfonate; acrylic acid; an allylic monomer; di-allyl phthalate; 2-acrylamido 2-methyl propane sulfonic acid, acrylic acid, di-allyl maleate; allyl diglycol carbonate; vinyl formate; vinyl acetate; vinyl propionate; vinyl butyrate; crotonic acid; itaconic acid; vinyl fluoride; vinyl chloride; vinylidine; fluoride; tetrafluoroethylene; acrylamide; methacrylamide; methacrylonitrile; acrolein; methyl vinyl ether; ethyl vinyl ether; vinyl ketone; ethyl vinyl ketone; allyl acetate; allyl propionate; diethyl maleate; a diene monomer; butadiene; isoprene; chloroprene; a derivative thereof; and a combination thereof.

18. The method of claim 17 wherein at least one of the unsaturated terminal groups comprises at least one group selected from the group consisting of: a substituted or unsubstituted ethylenically unsaturated group, a vinyl group, an allyl group, an acryl group, an unsaturated ester, an acrylate, a methacrylate, a butyl acrylate, an amide, an acrylamide, an ether, a vinyl ether, a combination thereof, and a derivative thereof.

19. The method of claim 17 wherein the gelling agent comprises at least one gelling agent selected from the group consisting of: an ethylenically unsaturated monomer of the general formula $CH_2=CXY$, wherein X and Y may be hydrogen, an alkyl group, an aryl group, an alkoxy group, a carboxylic acid group, an amide group, an ester, an ether, an alkoxy amide group, or an acetamide group; ethylene; propylene; butene-1; vinyl cyclohexane; vinyl cyclohexene; styrene; vinyl toluene; an ionizable monomer; 1-N,N-diethylaminoethylmethacrylate; diallyldimethylammonium chloride; 2-acrylamido-2-methyl propane sulfonate; acrylic acid; an allylic monomer; di-allyl phthalate; di-allyl maleate; allyl diglycol carbonate; vinyl formate; vinyl acetate; vinyl propionate; vinyl butyrate; crotonic acid; itaconic acid; vinyl fluoride; vinyl chloride; vinylidine fluoride; tetrafluoroethylene; acrylamide; methacrylamide; methacrylonitrile; acrolein; methyl vinyl ether; ethyl vinyl ether; vinyl ketone; ethyl vinyl ketone; allyl acetate; allyl propionate; diethyl maleate; a diene monomer; butadiene; isoprene; chloroprene; a derivative thereof; and a combination thereof.

20. A method of providing fluid loss control in a subterranean application comprising the steps of:
   providing degradable crosslinked gelled particles that are formed by a reaction comprising a gelling agent, and a stimuli-degradable cross linking agent that includes at least one degradable group and two unsaturated terminal groups;
   introducing the degradable crosslinked gelled particles into a subterranean formation; and
   allowing the degradable crosslinked gelled particles to reduce the loss of fluid to a portion of the subterranean formation.

* * * * *